(12) United States Patent
Vervaeke

(10) Patent No.: US 11,071,286 B2
(45) Date of Patent: Jul. 27, 2021

(54) PHEROMONE COMPOSITION

(71) Applicant: VERVAEKE-BELAVI, Tielt (BE)

(72) Inventor: Steven Vervaeke, Tielt (BE)

(73) Assignee: VERVAEKE-BELAVI, Tielt (BE)

( * ) Notice: Subject to any disclaimer, the term of this patent is extended or adjusted under 35 U.S.C. 154(b) by 407 days.

(21) Appl. No.: 16/309,842

(22) PCT Filed: Jun. 15, 2017

(86) PCT No.: PCT/EP2017/064725
§ 371 (c)(1),
(2) Date: Dec. 13, 2018

(87) PCT Pub. No.: WO2017/216320
PCT Pub. Date: Dec. 21, 2017

(65) Prior Publication Data
US 2019/0246610 A1    Aug. 15, 2019

(30) Foreign Application Priority Data
Jun. 15, 2016   (BE) .................................. 2016/5445

(51) Int. Cl.
*A01K 45/00* (2006.01)
*A01K 41/00* (2006.01)
(Continued)

(52) U.S. Cl.
CPC ............ *A01K 45/007* (2013.01); *A01K 29/00* (2013.01); *A01K 41/00* (2013.01); *A01K 45/005* (2013.01); *A61D 7/00* (2013.01)

(58) Field of Classification Search
CPC ........ A01K 29/00; A01K 41/00; A01K 45/00; A01K 45/005; A01K 45/007; A61D 7/00
See application file for complete search history.

(56) References Cited

U.S. PATENT DOCUMENTS 6,152,082 A * 11/2000 Simmons ............. A01K 13/003
119/651
2003/0226519 A1* 12/2003 Burridge .................. A61D 7/00
119/652

(Continued)

FOREIGN PATENT DOCUMENTS

EP         1 531 839 B1    5/2010
WO    WO-2004000336 A1 * 12/2003 ................ A61P 5/00
WO    WO-2004036986 A1 *  5/2004 ............. A01K 13/00

OTHER PUBLICATIONS

International Search Report dated Jul. 14, 2017, issued in corresponding International Application No. PCT/EP2017/064725, filed Jun. 15, 2017, 4 pages.

(Continued)

*Primary Examiner* — Michael H Wang
(74) *Attorney, Agent, or Firm* — Christensen O'Connor Johnson Kindness PLLC

(57) ABSTRACT

To produce chicks from hatching eggs, the eggs are incubated in a hatcher incubator. After hatching, chicks of lesser quality are screened out, and the remaining chicks are transferred to a poultry barn. During the first week in the barn, a number of chicks are lost. When the loss rate exceeds a certain value, treatment with antibiotics is usually applied. Methods and compositions for reducing the loss rate during the first week and thus the number of antibiotic treatments are disclosed. The methods include providing in the air of the hatcher incubator at least during a final stage of the incubation and hatching of the eggs in the hatcher incubator, an active amount of a pheromone composition with the appeasing effect of the mother hen pheromone. The pheromone composition can be applied in the hatcher incubator at a specific height in the form of a formulation.

17 Claims, 1 Drawing Sheet

(51) Int. Cl.
    *A61D 7/00*     (2006.01)
    *A01K 29/00*     (2006.01)

(56) References Cited

U.S. PATENT DOCUMENTS

2011/0150822 A1*   6/2011   Nouvel .................. A61K 47/12
    424/84
2018/0200219 A1*   7/2018   Lacoste .................. A61K 31/19

OTHER PUBLICATIONS

Written Opinion of the International Searching Authority dated Jul. 14, 2017, issued in corresponding International Application No. PCT/EP2017/064725, filed Jun. 15, 2017, 5 pages.

Madec, I., et al.,"Are thirty-five days enough to observe the stress-reducing effect of a semiochemical analogue on chickens (*Gallus Gallus domesticus*) housed under high density?" XP-002766104, Database accession No. PREV200800267792, Database Biosis [online] Biosciences Information Services, Poultry Science, vol. 87, No. 2, Feb. 2008, 2 pages.

* cited by examiner

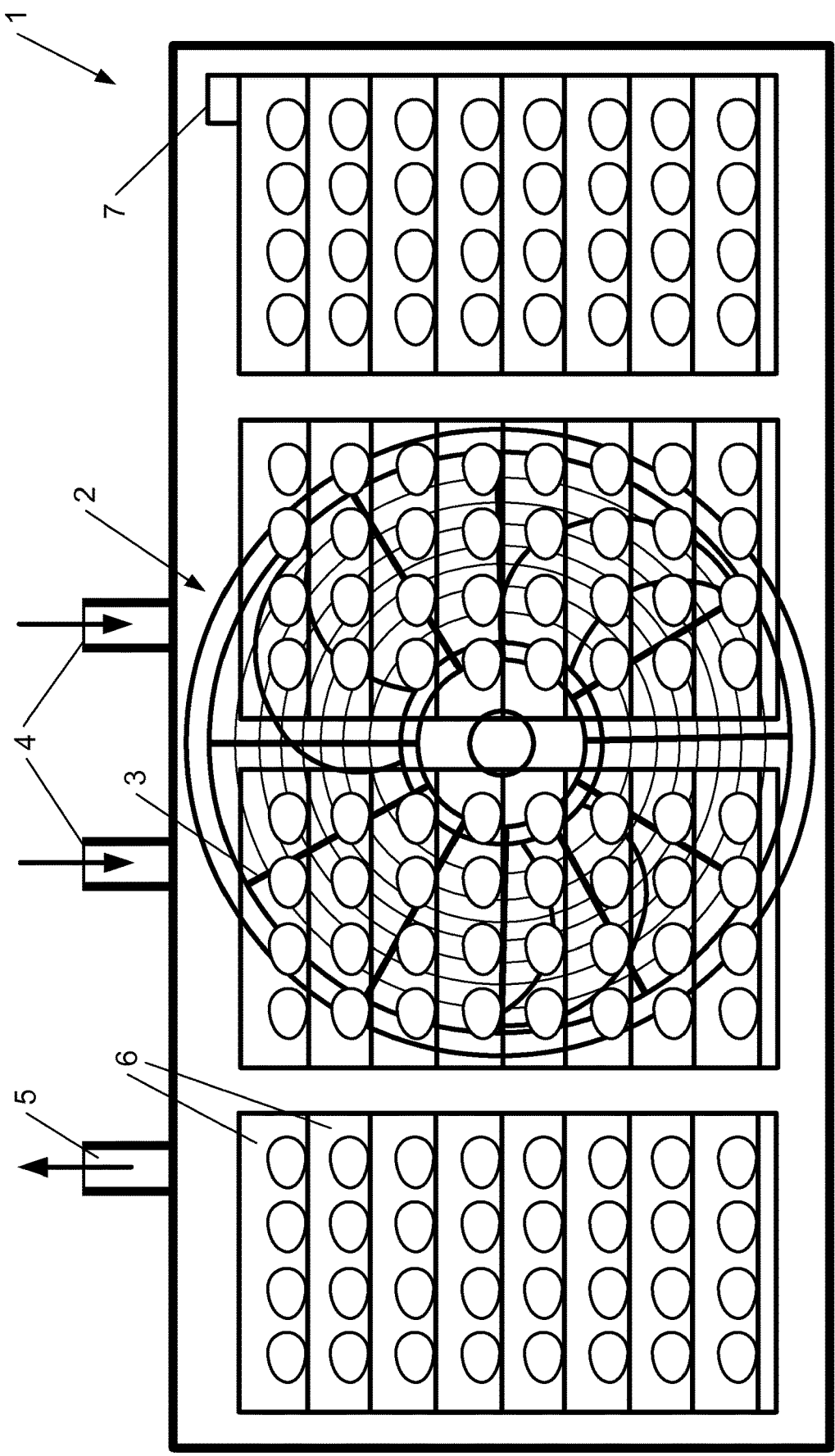

PHEROMONE COMPOSITION

The present invention relates to a method for producing chicks from hatching eggs and to the pheromone composition used therein. The hatching eggs are pre-incubated, during a setting stage, and then further incubated and hatched, during a hatching stage, in a hatcher incubator containing a predetermined volume of air. The hatched chicks are taken out of the hatcher incubator, after which chicks of lesser quality are screened out and the remaining chicks are placed in transport containers with which they are transferred to a poultry barn where they are first given water and feed.

In practice, most day-old chicks are produced as broilers which are further bred in a broiler house until they reach their slaughtering age. Other day-old chicks are intended for breeding of parent flock for breeding establishments producing hatching eggs or for breeding laying hens for the production of consumer eggs.

In a hatchery, the hatching eggs are usually incubated during the setting stage in setter trays in a setter incubator. After candling to find out which eggs contain a chick, they are transferred into hatching trays that are loaded into a hatcher incubator for further incubation of the eggs until most of the eggs have hatched. The hatcher incubator is then emptied, after which the chicks are separated from the eggshells. Chicks of lesser quality are screened out and the remaining chicks are placed in transport containers to be transported to a poultry barn where they can mature further. Only after arriving in this barn, are the day-old chicks given water and feed for the first time.

When rearing the animals in the barn, their health is monitored carefully. In practice, antibiotics are usually given to the chicks if the mortality or loss rate of the young animals exceeds a certain value. This happens especially when the loss rate is more than 0.2% per day. The administration of antibiotics is firstly an additional economic cost. In addition, the use of antibiotics in animals is being increasingly restricted. After all, the high use of antibiotics in livestock farming is contributing to the rise of antibiotic-resistant bacteria in humans. Thus, new solutions are being actively sought to avoid the use of antibiotics during their first days in the barn.

In practice, it has already been attempted to reduce the loss rate in a broiler house during the first week by not letting the incubated eggs hatch in a hatcher incubator in the hatchery, but by transferring them to the barn before the hatching, so that the chicks hatch in the barn. In this way, the chicks will have access to the feed and water immediately after hatching. To allow the chicks to hatch in the barn itself, a system must be provided onto which the hatching trays can be placed in the barn. For example, the well-known X-Treck system includes a belt conveyor on which the setter trays can be placed. After the eggs have hatched, the chicks jump off this belt conveyor onto the floor of the barn, after which the system in the poultry barn can be raised. In addition to the cost of such a system, a further disadvantage is the fact that the poultry farmer loses one or two days of precious time because the barn is now not only used to rear the chicks, but also to let the chicks hatch. This last disadvantage is remedied in the well-known Patio system in which the chicks reside on the stacked belt conveyors during the first few weeks, and are given feed and water there, after which they are transferred to the actual barn. Such a Patio system thus increases production capacity but involves a significant investment.

According to the second chapter of the doctoral thesis of Lotte van de Ven 'Effects of hatching time and hatching system on broiler chick development', extensive tests with the Patio system with a total of approximately 780,000 hatching eggs showed that that the cumulative mortality in the first 7 days was on average 1.21%, while extensive epidemiological studies in the Netherlands during 2004-2006 showed that the average mortality during the first week was around 1.5%. However, from the extensive data of the applicant, it appears that today, the mortality of day-old chicks from a hatchery may, on average, be even lower than the mortality established in the Patio system and amounted to only 1.02% in the comparative test results given below.

A further disadvantage of the solutions in which the chicks hatch in the barn is that it is the poultry farmer who must make the necessary efforts and investments for this purpose. The producer of the chicks itself therefore has no control over this. If the producer lets their chicks hatch in the hatchery, this therefore does not solve the relatively high loss rate during the first week in the barn, and the associated antibiotic treatments for which he is held responsible.

The object of the invention is thus to provide a new method for producing chicks which allows the loss rate in the barn during the first week to be reduced, and thus also the associated antibiotic consumption, without having to let the chicks hatch in the barn itself.

To this end, the method according to the invention is characterised in that, at least during a final stage of the further incubation and hatching of the eggs in the hatcher incubator, an effective amount of a pheromone composition with the appeasing effect of the mother hen pheromone is provided in the air in the hatcher incubator. The pheromone composition according to the invention is a pheromone composition with the appeasing effect of the mother hen pheromone for use in a method for producing chicks from hatching eggs, in which the eggs are incubated, during the setting stage; the eggs are further incubated and hatched, during the hatching stage, in a hatcher incubator containing a predetermined volume of air; the hatched chicks are taken out of the hatcher incubator; chicks of lesser quality are screened out; and the remaining chicks are placed in transport containers that are intended to transfer the chicks to a barn, where they will be given feed for the first time, wherein at least during a final stage of the further incubating and hatching of the eggs in the hatcher incubator, an active amount of the pheromone composition will be provided in the air in the hatcher incubator. The pheromone composition is specifically intended for reducing the mortality of the chicks and/or the antibiotic consumption after transferring the chicks to the barn.

Surprisingly, it was found that, even though the chickens do not eat or drink in the hatchery itself, they will still have greater resistance during their first days in the barn due to the pheromone treatment, causing the cumulative mortality rate to be significantly lower during the first week and thus reducing the number of antibiotic treatments even greater. The extensive test results showed that mortality of an average of 1.00% could be limited to only 0.83%, which is a decrease of about 17%, while the number of antibiotic treatments could even be reduced by about 32%.

Although the use of the mother hen pheromone is in itself already known, it is only used in the barn in which the chicks are further raised until they reach their slaughtering age. For example, as described in their article 'Are Thirty-Five Days Enough to Observe the Stress-Reducing Effect of a Semio-chemical Analogue on Chickens (*Gallus domesticus*) Housed under High Density' (Poultry Science 87:222-225), Madec et al. applied a mother hen pheromone composition to promote growth and weight gain in growing broilers and also to reduce stress in these chicks. They placed the day-old chicks in two barns in a density of 21 chicks per square metre. Other researchers had shown that stress occurs in chicks from a density of 15 chicks per square metre, mainly towards the end of the growing period, when the broilers become heavier and thus take up more space. In their tests, Madec et al. made use of a synthetic analogue of the mother hen pheromone, namely of methyl esters of the fatty acids present in this pheromone. The composition of the mother hen pheromone itself is described in EP 1 531 839 B1. This composition consists of a mixture of 12.3 to 13.7 wt % lauric acid, 38.0 to 42.0 wt % palmitic acid, 32.3 to 35.7 wt % linoleic acid and 12.0 to 14.0 wt % oleic acid.

In Madec et al., the pheromone composition was administered in the form of 150 g blocks containing a gelatine matrix containing 3 g (=2%) of the active pheromone composition, i.e. of the methyl esters of the fatty acids present in the mother hen pheromone. The blocks were located in perforated plastic containers suspended in the barn, after opening thereof, at a height of 120 cm (1 block per 50 $m^2$ of barn area). The components of the pheromone composition evaporated from the gelatine blocks, and because they were heavier than air, reached the level of the chicks in the barn. For the mother hen pheromone to be able to work immediately, the blocks were already hung up in the barn the day before the arrival of the day-old chicks, after which they were replaced every 15 days. On the assumption that the complete pheromone composition will evaporate from the blocks during this period, and that the barn had an average height of 4 m, approximately 1 mg of pheromone composition/$m^3$/day was evaporated in the air in the barn.

Just prior to slaughter, at the age of 35 days, the stress level of the chickens was determined by the heterophile/lymphocyte ratio (HLR) and the corticosterone content (CS). The chickens bred in the presence of the pheromone composition showed a lower value of HLR and CS, which indicates a lower stress level. The use of the pheromone composition also promoted the growth of the chicks. This was measured not only before slaughter but, in contrast to the stress level, also after 17 days. A positive impact on growth was observed each time.

In EP 1 531 839 B1, too, growth promotion was found when using the mother hen pheromone, where the ratio between the amount of feed and the weight gain was slightly increased. In other words, to increase growth, more feed had to be given. It was also found that by applying the mother hen pheromone, the stress level was reduced just prior to transfer to the slaughterhouse, which caused the broilers to damage each other less during transport to the slaughterhouse. In EP 1 531 839 B1, it is recommended to apply the mother hen pheromone to the chicks immediately after they have come out of the egg. As recommended by the manufacturers of the mother hen pheromone composition, this pheromone composition is in practice used as quickly as possible by already applying it—as in the method described in this European patent and also in the method followed by Madec et al.—the day before the arrival of the chicks in the barn, such that the pheromone will already have spread through the barn before the chicks are transferred therein. Upon arrival in the barn, the chicks can start eating immediately and the pheromone composition can immediately exert its growth-promoting effect.

In the above-mentioned prior art, no mention is made that the presence of the pheromone composition in the barn could reduce the mortality of the chicks, and thus the antibiotic use, during the first week. Because the chicks initially still have a lot of space in the barn, the pheromone composition may not be expected to affect the stress level of the chicks during those first days, and certainly not any deaths that could be caused by it.

However, according to the invention, it has now been found that if the chicks are already allowed to hatch in the presence of the pheromone composition in the hatcher incubator, before they are transferred to the barn, the mortality of the chicks during the first week after transfer to the barn was significantly reduced. The mortality during the first week in the barn is not due to any aggression between the chicks during transport in the transport containers because during transport no or substantially no mortality occurs. Also, the day-old chicks are not at all aggressive to one other and neither are they strong enough yet to injure each other. It is thus surprising that the use of the pheromone composition can result in such a reduction in mortality during the first week, especially since the chicks are not given any feed before being transferred to the barn, such that the pheromone composition can also not increase feed intake and growth.

In a preferred embodiment of the pheromone composition and the method according to the invention, the pheromone composition is provided in the air in the hatcher incubator at least during the last 24 hours, preferably at least during the last 36 hours before the chicks are removed from the hatcher incubator.

In the hatcher incubator, the chicks begin to hatch on the nineteenth day (counting from the day the hatching eggs are placed in the setter incubator). Hatching of the eggs is spread such that the first chicks can be in the hatcher incubator, for example, up to 30 hours, before the hatcher incubator is emptied, which occurs on the twenty-first day. By applying the pheromone composition during the last hours of hatching in the hatcher incubator, the most chickens are thus treated. The chicks hatching last stay in contact with the air with the pheromone composition for the least time. However, the eggs themselves have already been in contact with the pheromone composition for a number of hours, allowing the pheromone composition to penetrate through the porous eggshell into the eggs.

In a further preferred embodiment of the pheromone composition and the method according to the invention, during the last 24 hours, before the chicks are taken out of the hatcher incubator, an amount of at least 4 mg, preferably at least 8 mg, and more preferably at least 12 mg of pheromone composition is dispersed per $m^3$ of said air in this air.

This amount is the amount of the pheromone composition dispersed directly into the air in the hatcher incubator, or which may already be present in the air with which the air in the hatcher incubator is ventilated. In practice, the air in the hatcher incubator is significantly ventilated. The hatcher incubator is ventilated with an air flow which, depending on the type of hatcher incubator, may be up to 8 to 10 times the volume of the hatcher incubator per hour, or even 30 to 35 times this volume per hour. Notwithstanding this significant ventilation of the air in the hatcher incubator, it was found that by spreading such amounts of pheromone composition in the air in the hatcher incubator, the intended reduction of the loss rate could be achieved during the first week.

In a further preferred embodiment of the pheromone composition and the method according to the invention, the pheromone composition is introduced into said air by means of a formulation which releases the pheromone composition into the air by volatilisation. In this case, the formulation is preferably formed by an aqueous gel.

Due to the relatively high temperature prevailing in the hatcher incubator and due to the substantial air circulation created therein to achieve a uniform temperature at the level of all the eggs, the pheromone composition evaporates relatively quickly from the formulation and is spread uniformly in the air in the hatcher incubator. In this embodiment, the formulation can thus be simply placed in the hatcher incubator at a number of times. Preferably, this will occur at a certain height, which will preferably be at least 80% of the internal height of the hatcher incubator, such that the pheromone composition, which is heavier than air, will be better dispersed in the hatcher incubator and, among other things, will end up more on the upper eggs.

In an alternative preferred embodiment of the pheromone composition and the method according to the invention, the pheromone composition is introduced into said air by means of a liquid formulation which is atomised into said air.

In this way, the pheromone composition can also be dispersed uniformly into the air in the hatcher incubator, with a part of the liquid formulation even getting onto the eggs in the form of fine droplets, making it better penetrate the eggs themselves.

In a preferred embodiment of the pheromone composition and of the method according to the invention, at least 0.3%, in particular at least 0.4%, and more particularly at least 0.5% of the total number of chicks hatched in the hatcher incubator are screened out, where, of the total number of chicks hatched in the hatcher incubator, less than 2%, more preferably less than 1.5%, are screened out.

By sorting out such a quantity of chicks which are of lower quality, which may be weaker and thus more sensitive to diseases, the loss rate during the first week may be limited, thus also reducing the number of antibiotic treatments.

Further advantages and particulars of the invention will become apparent from the following description of some preferred embodiments of the pheromone composition and of the process according to the invention. However, this description is only given as an example and is not intended to limit the scope of protection as defined by the claims.

The reference numerals given in the description relate to the appended drawings, in which the only FIGURE shows a cross-section of a hatcher incubator into which the incubated eggs are introduced in order to allow them to hatch.

The invention relates to a pheromone composition and to a method for producing chicks from hatching eggs, i.e. of fertilised eggs, in which this pheromone composition is applied. The chicks are in particular the chicks of chickens. These can be used to breed layers, or to raise as broilers. The chicks can also, for example, serve for breeding broiler parent flock.

In practice, the chicks are for the most part produced in a hatchery. There, the hatching eggs are incubated (during the selling stage) in a setter incubator at a temperature of 37-38° C. After 18 days of incubating in the setter incubator, the eggs are candled, with the eggs containing no chicks being removed and the remaining eggs being transferred to a hatcher incubator, where they are further incubated and hatched until day 21.

FIG. 1 shows a schematic cross-section of a hatcher incubator 1. This cabinet 1 can be opened and closed completely by means of doors. There is a fan 2 against the rear wall inside. This fan 2 is known in practice as a 'pulsator' because it generates cyclic air movements in the hatcher incubator 1. With the fan 2, fresh air is sucked in through air inlets 4, as the blades 4 of the fan pass by these air inlets, at the same time removing the excess air through the air outlet 5. The air inlets 4 suck in conditioned air that is present at the top of the hatcher incubator 1, while removing the discharged air from the hatchery through a pipe system, and preferably over a heat exchanger.

By adjusting the rotational speed of the fan 2, the ventilation of the hatcher incubator 1 can be controlled. The ventilation of the hatcher incubator 1 preferably takes place at a flow rate that is at least 4, preferably at least 5, and more preferably at least 6 times the volume of air present in the hatcher incubator.

The fertilised eggs are located in the hatcher incubator 1 in hatching trays 6 stacked on top of each other. The fan 2 ensures a uniform dispersion of the aspirated fresh air and a uniform temperature in the entire hatcher incubator. The hatched chicks stay in the hatcher incubator in the hatching trays. On day 21, the chicks with the hatching trays 6 are taken out of the hatcher incubator, after which they are separated from the empty eggshells and placed in transport containers. A part of the chicks is screened out, namely the lesser quality chicks. Generally, at least 0.3%, preferably at least 0.4%, and more particularly at least 0.5% of the hatched chicks are screened out. Typically, less than 2%, preferably less than 1.5%, of the hatched chicks are screened out.

The chicks are usually also vaccinated. Sometimes a sugar solution is sprayed on the chicks, so that the chicks can take in a certain amount of sugar. However, this is not a complete feed. In addition, only a limited amount can be taken in. Thus, in the present description and conclusions, this is not considered 'feed', such that the chicks only get water and feed at the time they are placed in the barn. Before this, the chicks must first be transported with the transport containers to the poultry farmer, which is usually done with a truck.

For the producer of the chicks, it is important that the loss rate in the barn during the first week is as small as possible. This loss is due to a tower quality of the chicks, for which the chick producer can be held responsible. According to the invention, it has been found that this loss can be significantly reduced by providing an active amount of a pheromone composition with the appeasing effect of the mother hen pheromone in the air in the hatcher incubator 1 during the further incubating and hatching of the fertilised eggs in the hatcher incubator 1.

This pheromone composition consists of the active ingredients that provide the appeasing effect of the mother hen pheromone. The composition contains in particular at least lauric acid or a derivative thereof, palmitic acid or a derivative thereof, linoleic acid or a derivative thereof and oleic acid or a derivative thereof. Preferably, the derivative will be an alkyl ester, especially a methyl or ethyl ester. Good results were obtained when the pheromone composition contains methyl laurate, methyl palmitate, methyl linoleate and methyl oleate. Per mole of lauric acid or lauric acid derivative, the pheromone composition preferably contains 2.17 moles to 2.67 moles of palmitic acid or palmitic acid derivative, 1.68 moles to 2.07 moles of linoleic acid or linoleic acid derivative, and 0.62 moles to 0.81 moles of oleic acid or oleic acid derivative.

The pheromone composition is preferably contained in a formulation 7 with which it can be easily dispersed into the air of the hatcher incubator. The pheromone composition can firstly be contained in a liquid formulation that is atomised into the air of the hatcher incubator. The formulation can in particular be atomised in the hatcher incubator itself in the air contained therein and/or in the air with which the hatcher incubator is ventilated. If the atomised formulation does not immediately evaporate completely, it or part thereof will be deposited on the surfaces in the hatcher incubator in the form of fine droplets, and in particular also on the fertilised eggs contained therein and on the already hatched chicks.

The pheromone composition is preferably applied in the air of the hatcher incubator by means of a formulation 7 which releases the pheromone composition in this air by volatilisation. This formulation may be a liquid formulation from which the pheromone composition escapes through volatilisation (evaporation). However, as a solid formulation 7 is easier to handle, this is preferred. A solid formulation may be formed by, for example, an aqueous gel. Due to the relatively high temperature in the hatcher incubator and the air flow therein, such a gel can dry out relatively quickly, whereby the fatty acids of the pheromone composition will also volatilise. Such gels are commercially available and contain, as described in the article of Madec et al., for example, per 150 g, 135 g of water, 7 g of non-ionic surfactant, 5 g of gelling gum and 3 g of the pheromone composition consisting of the methyl esters of lauric acid, palmitic acid, linoleic acid and oleic acid.

Preferably, the formulation 7 is applied in the hatcher incubator at a certain height, for example, at a height which is preferably at least 80% of the internal height of the hatcher incubator. As a consequence, the pheromone composition, whose constituents are heavier than air, will descend more readily in the hatcher incubator and thus end up on the underlying eggs and chicks.

The pheromone composition will preferably be provided in the air in the hatcher incubator at least during the last 24 hours, more preferably at least during the last 36 hours before the chicks are removed from the hatcher incubator. The pheromone composition will thus have enough time to act on the chicks to obtain the beneficial effects on the loss rate during the first week and the number of antibiotic treatments. Preferably, during the last 24 hours before the chicks are taken out of the hatcher incubator, an amount of at least 4 mg, preferably at least 8 mg and more preferably at least 12 mg of pheromone composition per $m^3$ of air contained in the hatcher incubator is dispersed in this air. These amounts are the amounts of the pheromone composition that actually ends up in the air in the hatcher incubator (especially by volatilisation) and thus not the amounts contained in the fixed formulation put down in the hatcher incubator. Despite the significant ventilation in the hatcher incubator, the intended beneficial effects are thus obtained. These amounts therefore provide an active amount (concentration) of the pheromone composition in the air in the hatcher incubator, which means that due to this amount (concentration) of the pheromone composition, the losses in the barn during the first week are on average reduced, in particular, on average by more than 10%. Whether the pheromone composition is present in an active amount can also be checked by measuring the corticosterone level in the chicks when they have been mechanically separated from the eggshells and only just placed in the transport containers. In the chicks treated with the pheromone composition, this will be on average lower than in chicks not treated with the pheromone composition, preferably with a statistical probability or p value of less than 0.1.

Loss Rate Data without the Pheromone Composition

Over a period of 22 months, more than 30 million eggs were delivered by a hatchery to several broiler farms. During the production of these eggs, no chicken pheromones were used. However, chickens of lower quality were screened out before the chicks were delivered.

The loss rate of the day-old chicks was measured during the first week in the barn. The mortality over the first week was 1.00% for all chicks delivered.

Loss Rate Data with the Pheromone Composition

Over a period of 5 months, the same hatchery then delivered more than 8 million eggs to the broiler farms. The same hatcher incubators were used and the chicks of lesser quality were once again screened out.

However, the air in the hatcher incubator was now provided with a pheromone composition with the appeasing effect of the mother hen pheromone. In particular, in the hatcher incubators, in the upper hatching trays, per cubic metre of air volume of the hatcher incubator, approximately 0.7 g of a gel containing 3% of the pheromone composition, consisting of methyl esters of lauric acid, palmitic acid, linoleic acid and oleic acid, in the ratios indicated above, was applied. This was done three times, i.e. at 16:00 of day 19 and at 8:00 and 20:00 of day 20, each time without removing the previously applied gel. Due to the heat and air circulation in the hatcher incubators, the gel was largely dried out each time a new amount of gel was applied.

The loss rate of the day-old chicks was still measured during the first week in the barn. However, the mortality rate for the first week was only 0.83% for all chicks delivered, which corresponds to a 17% reduction in the loss rate.

In addition to the loss rate data, data related to the antibiotic treatments performed during the first 7 days were also recorded. This showed that for chicks produced during the last 5 months using the pheromone composition, on average, 32% less antibiotic treatments were required, for the same number of chicks, as compared to the number of antibiotic treatments during the preceding 22 months without the use of the pheromone composition.

The invention claimed is:

1. A method for producing chicks from hatching eggs, comprising:
    (a) pre-incubating the eggs;
    (b) further incubating and hatching the eggs in a hatcher incubator containing a predetermined volume of air;
    (c) taking the hatched chicks out of the hatcher incubator;
    (d) screening out chicks of lesser quality; and
    (e) placing the remaining chicks in transport containers that are intended to transfer the chicks to a barn, where they will be given feed for the first time,
    wherein at least during a final stage of the further incubating and hatching of the eggs in the hatcher incubator, an effective amount of a pheromone composition having the appeasing effect of the mother hen pheromone is provided in the air in the hatcher incubator.

2. The method of claim 1, wherein the pheromone composition is provided in the air in the hatcher incubator at least during the last 24 hours or at least during the last 36 hours before the chicks are removed from the hatcher incubator.

3. The method of claim 1, wherein during the last 24 hours before the chicks are taken out of the hatcher incubator, an amount of at least 4 mg, at least 8 mg, or at least 12 mg of pheromone composition per $m^3$ of said air is dispersed in this air.

4. The method of claim 1, wherein the pheromone composition is applied to said air by means of a formulation which releases the pheromone composition by volatilisation into this air.

5. The method of claim 4, wherein said formulation is formed by an aqueous gel.

6. The method of claim 4, wherein said formulation is applied in the hatcher incubator at a height which is at least 80% of the internal height of the hatcher incubator.

7. The method of claim 1, wherein the pheromone composition is applied to said air by means of a liquid formulation which is atomised in this air.

8. The method of claim 1, wherein the pheromone composition contains lauric acid or a derivative thereof, palmitic acid or a derivative thereof, linoleic acid or a derivative thereof, and oleic acid or a derivative thereof.

9. The method of claim 8, wherein said derivative is an alkyl ester.

10. The method of claim 8, wherein per mole of lauric acid or lauric acid derivative, the pheromone composition contains 2.17 moles to 2.67 moles of palmitic acid or palmitic acid derivative, 1.68 moles to 2.07 moles of linoleic acid or linoleic acid derivative, and 0.62 moles to 0.81 moles of oleic acid or oleic acid derivative.

11. The method of claim 8, wherein said derivative is a methyl or ethyl ester.

12. The method of claim 1, wherein the hatcher incubator is ventilated during the further incubation and hatching of the eggs with an air flow which is at least 4, at least 5, or at least 6 times said predetermined volume of air per hour.

13. The method of claim 1, wherein at least 0.3%, at least 0.4%, or at least 0.5% of the total number of chicks hatched in the hatcher incubator are screened out, where, of the total number of chicks hatched in the hatcher incubator, less than 2% or less than 1.5% are screened out.

14. The method of claim 1, wherein providing the pheromone composition reduces the mortality of the chicks after transferring the chicks to the barn.

15. The method of claim 14, wherein the mortality of the chicks after transferring the chicks to the barn is reduced during the first week after transferring the chicks to the barn.

16. The method of claim 1, wherein providing the pheromone composition reduces the use of antibiotics after transferring the chicks to the barn.

17. The method of claim 16, wherein the use of antibiotics after transferring the chicks to the barn is reduced during the first week after transferring the chicks to the barn.

* * * * *